US009860005B2

(12) United States Patent
Haug et al.

(10) Patent No.: US 9,860,005 B2
(45) Date of Patent: Jan. 2, 2018

(54) METHOD FOR OPERATING MOBILE PLATFORMS

(71) Applicant: Robert Bosch GmbH, Stuttgart (DE)

(72) Inventors: Florian Haug, Ditzingen (DE);
Christopher Brown, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 14/627,484

(22) Filed: Feb. 20, 2015

(65) Prior Publication Data

US 2015/0248120 A1    Sep. 3, 2015

(30) Foreign Application Priority Data

Feb. 28, 2014   (DE) ......................... 10 2014 203 723

(51) Int. Cl.
*H04J 3/10*   (2006.01)
*G05B 15/02*   (2006.01)
*G05D 1/02*   (2006.01)

(52) U.S. Cl.
CPC ................ *H04J 3/10* (2013.01); *G05B 15/02* (2013.01); *G05D 1/0297* (2013.01); *G05D 2201/0216* (2013.01)

(58) Field of Classification Search
CPC .. H04J 3/10; G05D 1/0297; G05D 2201/0216
See application file for complete search history.

(56) References Cited

U.S. PATENT DOCUMENTS

| 6,437,743 | B1* | 8/2002 | Mintz | ............... | G01S 5/0027 342/457 |
| 6,678,394 | B1* | 1/2004 | Nichani | ............. | G05D 1/0251 348/169 |
| 6,888,491 | B2* | 5/2005 | Richter | ............... | G01S 7/023 342/129 |
| 7,312,692 | B2* | 12/2007 | Friedrich | ........... | G06K 7/10049 340/10.1 |
| 8,401,560 | B2* | 3/2013 | Potkonjak | ............ | H04W 64/00 342/385 |
| 8,520,695 | B1* | 8/2013 | Rubin | ..................... | G08G 9/02 370/337 |
| 8,548,494 | B2* | 10/2013 | Agarwal | ................. | G01S 19/48 381/58 |
| 8,909,251 | B2* | 12/2014 | Agarwal | ................. | G01S 19/48 381/58 |
| 2003/0001779 | A1* | 1/2003 | Mintz | ............... | G01S 5/0027 342/463 |

(Continued)

FOREIGN PATENT DOCUMENTS

DE        40 16 458 A1   11/1991
DE        40 35 501 A1    5/1992
DE   10 2010 062 990 A1   6/2012

Primary Examiner — Thomas G Black
Assistant Examiner — Peter D Nolan
(74) Attorney, Agent, or Firm — Maginot, Moore & Back LLP

(57) ABSTRACT

A method for operating mobile platforms in a three-dimensional environment, wherein the mobile platforms are set up for propagation-delay-based distance measurement and/or position measurement, includes the mobile platforms being assigned differently timed timeslots for the distance measurement and/or the position measurement by a central switching center.

12 Claims, 1 Drawing Sheet

(56) References Cited

U.S. PATENT DOCUMENTS

| | | | | |
|---|---|---|---|---|
| 2004/0066323 A1* | 4/2004 | Richter | ............... | G01S 7/023 |
| | | | | 342/70 |
| 2006/0165026 A1* | 7/2006 | Apneseth | ............ | G05B 19/414 |
| | | | | 370/322 |
| 2008/0150786 A1* | 6/2008 | Breed | ............... | B60N 2/2863 |
| | | | | 342/53 |
| 2013/0278441 A1* | 10/2013 | Rubin | ................. | G08G 9/02 |
| | | | | 340/905 |
| 2013/0278442 A1* | 10/2013 | Rubin | ................. | G08G 9/02 |
| | | | | 340/905 |
| 2013/0282267 A1* | 10/2013 | Rubin | ................. | G08G 9/02 |
| | | | | 701/301 |
| 2013/0282277 A1* | 10/2013 | Rubin | ................. | G08G 9/02 |
| | | | | 701/517 |
| 2015/0331093 A1* | 11/2015 | Pandharipande | .. | H05B 37/0227 |
| | | | | 367/93 |
| 2016/0003946 A1* | 1/2016 | Gilliland | ............... | G01S 17/10 |
| | | | | 356/5.01 |

* cited by examiner

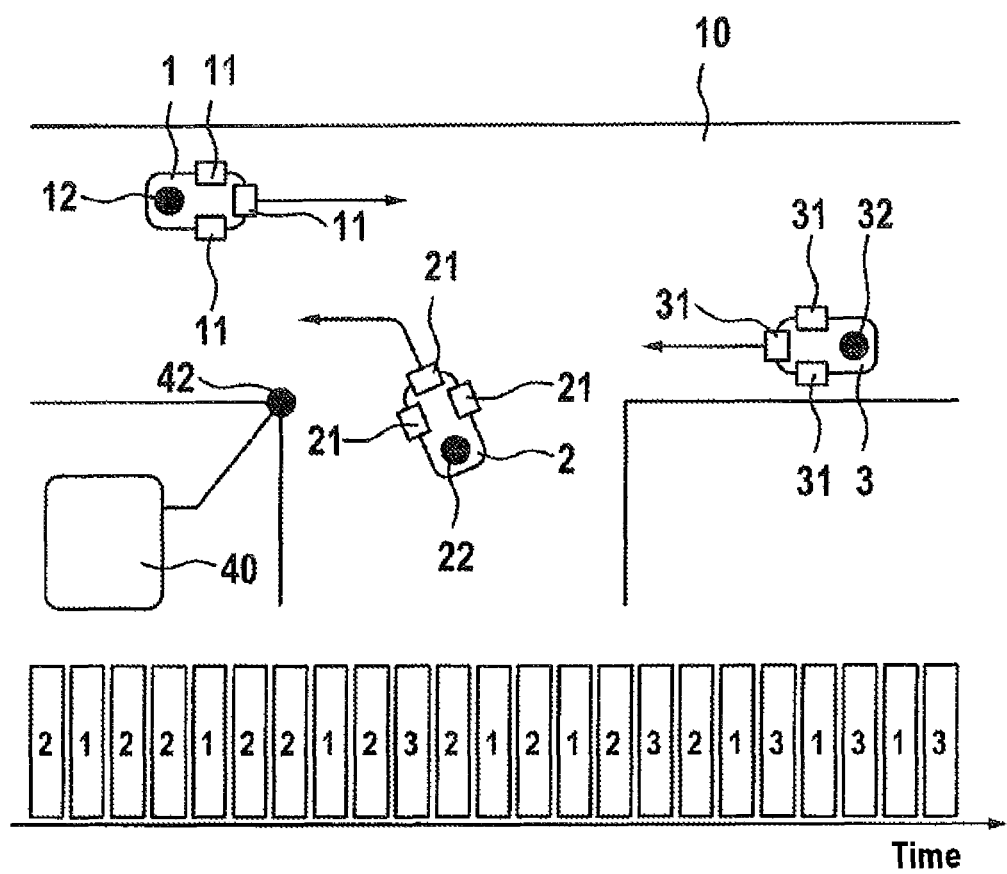

METHOD FOR OPERATING MOBILE PLATFORMS

This application claims priority under 35 U.S.C. §119 to patent application no. DE 10 2014 203 723.9, filed on Feb. 28, 2014 in Germany, the disclosure of which is incorporated herein by reference in its entirety.

The present disclosure relates to a method for operating a fleet of mobile platforms with a propagation-delay-based distance and/or position measurement. Furthermore, the disclosure relates to control programs, an electronic storage medium and an electronic controller for carrying out the method.

BACKGROUND

For vehicles, industrial trucks and for mobile platforms quite generally, sensor systems are known in order to be able to use an active system to sense the environment and particularly perform distance and/or position measurement. In this case, the distance to objects can be determined from the propagation delay of electromagnetic or acoustic waves. In principle, this involves a signal being sent to a measurement object, from which it is reflected. The time measured for the journey to and fro is used to compute the object distance therefrom. This principle is the basis for ultrasonic systems, for example. In addition, this principle is also the basis for laser distance measurement. Besides distance measurement, it is additionally also possible to determine the direction of an object. Depending on the system configuration, there are several possibilities for this. If the system has a plurality of individual sensors, for example, the direction can be estimated by means of what is known as trilateration. This method is often used for sensors on the bumpers of motor vehicles. If an array having a large number of sensors is used, the direction can also be estimated by means of the phase difference between a plurality of synchronized individual sensors in the array, for example. The German laid-open specification DE 10 2010 062 990 A1 describes an ultrasonic sensor or sound transducer that is suitable for such distance and/or position measurements.

The principle of propagation-delay-based distance and/or position measurement is thus based on the emission of a sound pulse or light pulse into the environment and the capture of the reflected signal as what is known as an echo. In this context, it is important that the echo can also actually be attributed to the emitted signal. This can become a problem when a plurality of units performing distance and/or position measurement on the basis of the same principle encounter one another or are in physical proximity.

There are already various approaches for suppressing or at least reducing such interference. Examples are coding of the transmitted pulses, for example using the respective frequency and/or the amplitude. Another possibility is to apply jitter to the measurement signal repetition rate, that is to say to apply random deviations, as is known from vehicle technology. Other possibilities are an adaptive change of operating frequency or of coding.

The German laid-open specification DE 40 35 501 A1 describes a method for determining the relative position of vehicles in road traffic by emitting ultrasonic signals and measuring the propagation delay. Prior to the measurement between the vehicles, cyclic transmission of a data telegram to all vehicles in the surroundings of the measurement takes place, the data telegram containing a time or time slots for the emission of ultrasonic signals.

The German laid-open specification DE 40 16 458 A1 describes another system for distance measurement between motor vehicles. In this case, information is transmitted in at least one direction by means of electromagnetic waves. In addition, acoustic impulses are transmitted in the opposite direction. The information transmitted by means of the electromagnetic waves contains information about the reception time of the acoustic impulse or about information derived therefrom. Communication between the vehicles can be effected using a time-division multiplexing system in this case.

SUMMARY

The present disclosure proposes a method for operating mobile platforms in a three-dimensional environment. The mobile platforms are set up for propagation-delay-based distance and/or position measurement. By way of example, the propagation-delay-based distance and/or position measurement is based on an ultrasonic system or a laser system or a radar system. The platforms can be controlled using a central switching center. According to the disclosure, the mobile platforms are assigned differently timed time slots for the distance and/or position measurement by the central switching center. In this context, the expression "time slots" means a narrow to very narrow time window, for example in the region of milliseconds, e.g. in a range between 10 and 500 ms. Ultrasound-based distance and/or position measurement can involve the use of time slots of approximately 20 to 120 ms, for example. Suitable time slots for laser or radar systems can be shorter. According to the disclosure, the assigned time slots have different timing, that is to say that the beginning and/or end of the time slots differ. It is particularly expedient if the time slots do not overlap. Within the respectively assigned time slot, the respective mobile platform can perform the distance and/or position measurement. This method can be used to reliably prevent collisions or obstructions that involve reciprocal disturbance of the distance and/or position measurement.

The operation and particularly the fleet operation of mobile platforms is based inter alia on a suitable system for distance and/or position measurement for the individual platforms. By way of example, mobile platforms are used as industrial trucks in warehouses or production halls or as mobile transport robots in hospitals, care facilities or the like. These are, in particular, self-propelled mobile platforms that are equipped with a dedicated drive and that are controlled automatically, that is to say without the direct involvement of a person. Mobile platforms of this kind can autonomously undertake the transport of various materials or samples. The platforms move freely within the premises, such as in passageways, corridors, elevators or halls. For distance and/or position measurement, laser systems or radar systems or ultrasonic systems are provided, in particular. Ultrasonic systems are particularly common, since ultrasound is not perceived as a disturbance by people in the environment of the platforms. When a plurality of mobile platforms are being operated, it is usually inevitable that two or more mobile platforms meet. Below a certain physical proximity among the platforms, it may then arise that the distance and/or position measurements of the individual mobile platforms disturb one another. The reason for this is that the individual mobile platforms are unable to distinguish whether the echo from an emitted signal in the course of the distance and/or position measurement comes from the respective platform itself or from another platform. This can lead to errors in the distance and/or position measurement of the individual platforms that can sometimes have significant associated consequences, for example collisions and jams. The particular advantage of the method according to the disclosure is that such interference among the individual mobile platforms is prevented by virtue of the individual mobile platforms, particularly when needed, that is to say on the basis of the situation, being assigned time slots for sending and receiving measurement pulses, for example ultrasonic signals or laser signals or radar signals. The time slots have different timing than one another, which means that there is no possibility of a mobile platform receiving the echo from an emitted signal from another platform and wrongly evaluating it for its own distance and/or position measurement. According to the disclosure, the time slots are assigned by a central switching center (ZVS) as a control unit. Said central switching center can, if need be, also be set up locally at short notice and adopted, for example at short notice, by a controller of one of the mobile platforms involved.

Preferably, the time slots are assigned by the central switching center in phases. That is to say that the assignment of the time slots is effected not without interruption throughout operation but rather only in particular phases or under particular conditions. Those phases of the operation in which the assignment is effected can differ depending on the embodiment of the method.

In one embodiment of the method, the assignment of time slots is on the basis of the position of the mobile platforms within the environment or within the premises in which the platforms move. By way of example, there may be provision for the assignment of time slots to be effected automatically at particular locations within the premises, for example in junction areas or in narrow passageways, where a plurality of the mobile platforms are expected to meet. This is generally associated with the mobile platforms being slowed down in these areas. The advantage in this case is that interference among the mobile platforms is prevented at these bottlenecks without the need to evaluate the position of the mobile platforms in relation to one another.

In a particularly preferred embodiment of the method according to the disclosure, corresponding time slots are assigned only when there are actually two or more mobile platforms in physical proximity and interference can actually arise. Particularly preferably, the assignment of time slots is therefore effected on the basis of the position of the mobile platforms in relation to one another. In particular, the assignment of time slots can be effected when at least two mobile platforms are in physical proximity to one another. In this context, the term "physical proximity" means that the mobile platforms are in an area in which the signals respectively emitted for distance and/or position measurement and the echoes to be received can coincide, as a result of which the mobile platforms can wrongly receive an echo that is based on a signal from another mobile platform. This physical proximity can also be described as the transmission and reception range or as the disturbance range for the distance and/or position measurement. Depending on system configuration and embodiment of the sensor system, the magnitude of the disturbance range for a particular platform can comprise a radius of up to 15 m or up to 10 m, for example. In the case of conventional ultrasonic systems, for example, disturbances appear in a range up to 12 m. The magnitude of the respective disturbance range is preferably set up or adjusted as appropriate depending on the system configuration. As soon as the disturbance ranges of the individual mobile platforms touch or coincide, the disclosure provides for the assignment of differently timed time slots to be able to be effected for the distance and/or position measurement.

Synchronization of the mobile platforms by the assignment of time slots using the central switching center has the particular advantage that all information pertaining to the mobile platforms, for example including position data, converges at the central switching center. The central switching center can readily be used to identify whether and which platforms are in a disturbance range. Advantageously, a shared global coordinate system is used for the location information. Since map information about the respective building and/or premises is usually available at the central switching center anyway, this information can be used for the method according to the disclosure. The central switching center therefore undertakes the task of monitoring the position of the individual mobile platforms and if need be identifying when two or more platforms move such that the distance and/or position measurements thereby disturb one another. If this is the case, the measuring systems are synchronized using the central switching center such that they emit their measurement pulses alternately at certain intervals of time. This is preferably accomplished such that only one measurement pulse is ever present in the environment at the same time. The mobile platform that has emitted said measurement pulse, that is to say the currently active platform, can then sense its surroundings as usual without there being the risk that disturbing signals are being emitted by other mobile platforms. The other mobile platforms in the environment are deactivated (passive) in respect of their distance and/or position measurement in this time, that is to say in this time slot. Provision may also be made for the platforms that are deactivated in principle likewise to draw further information about the surroundings from the echo signals from the respective active mobile platform, provided that the central switching center can transmit the position of the various transmitters to all measuring systems of the affected mobile platform with sufficient accuracy and appropriate evaluation can be effected. If, by way of example, a "deactivated" platform knows, or is sent, the transmitter position for the active system and the time of emission of the pulse, it can "passively" detect and evaluate the incoming echo or determine the propagation delay. If the passive system is furthermore able to determine the direction from which the echo is incoming, as is possible in the case of array systems, for example, then geometrical considerations can also be used by the "deactivated" platform to exactly ascertain the position of the object producing the echo. Sensing of the surroundings is then also possible for the "deactivated" platform. However, this applies only to a limited extent, since there is no assurance that the entire surroundings of the "deactivated" platform have measurement pulses applied, that is to say have light or sound applied, for example, by the active system.

The method according to the disclosure has the particular advantage that the distance and/or position measurement of the mobile platforms can be operated as usual, particularly with a high shot repetition rate for the measurement pulses, while there is no other mobile platform in range. In this case, the high shot repetition rate also allows high speeds for the mobile platforms. Only when a plurality of platforms are encountered or when the disturbance ranges of the platforms coincide does the disclosure provide for the repetition rate to be restricted by the assignment of the differently timed time slots so as also to be able to afford the other mobile platform(s) time slots for sending/receiving. The accompanying necessary reduction in the maximum speed of the platforms is generally acceptable, since this ensures particularly safe operation. From other aspects too, the reduction in the maximum speeds when mobile platforms are encountered is not disadvantageous, since such encounters predominantly arise in junction areas, where there is provision for the speed to be restricted anyway.

A further particular advantage of the method according to the disclosure is that the system is not limited to a maximum number of platforms encountering one another. In principle, it is possible for any number of mobile platforms to be operated in a tight space, since the individual mobile platforms are each, for example successively, assigned time slots for the distance and/or position measurement, so that the individual mobile platforms can move in succession as appropriate without collisions or jams occurring. The method can therefore also be used for large or relatively large fleets of mobile platforms for which it is not possible to ensure that only a small fixed number of platforms meet at the junction, for example.

In a particularly preferred embodiment of the method according to the disclosure, there is provision for the assignment of time slots to be prioritized for individual instances of the mobile platforms. These prioritized platforms are handled with preference during the allocation of time slots so that said prioritized platforms can move more quickly and, by way of example, can reach their destination more quickly. By way of example, the platforms with higher priority can be provided with more time slots or longer time slots than the platforms with lower priority or without priority. The platforms with higher priority can then move more quickly on account of the higher repetition rates for the distance and/or position measurements. Prioritization of a platform can be made dependent on various criteria, for example on the battery state of charge of the platform or how urgent or important the transport of the respective goods is. In addition, prioritization can be made dependent on the position or location of the respective platform. By way of example, if a particular platform is blocking a junction, this platform can be handled with priority during the allocation of time slots in order to be able to clear the junction as quickly as possible. Synchronization using the central switching center is also very advantageous in this context, since the information required for allocating a priority is available at the central switching center or converges thereat.

A particular advantage of the method according to the disclosure is that the synchronization mechanism is simple to implement and, particularly in the case of systems that already have a central switching center, generally requires no additional outlay. The method according to the disclosure is therefore inexpensive and easy to implement in practice. Usually, there is already a central switching center in place for fleet operation of mobile platforms, since the allocation of work orders to the individual mobile platforms is generally effected using a central switching center of this kind. In cases in which there is no central switching center in place, the method according to the disclosure can, in principle, also be set up using local communication, with a to some extent local central switching center being provided on one of the platforms at short notice. Such methods of operation are known from what are known as car-to-X systems, for example. This technology known from application in motor vehicles can also be used for the method according to the disclosure, as a result of which it is possible for the individual mobile platforms to be synchronized to one another.

The method according to the disclosure is suitable, in principle, for synchronizing all distance and/or position measuring systems for mobile platforms that are based on propagation delay analysis of measurement pulses, the method according to the disclosure being provided in order to avoid interference in systems of the same design in each case. The distance and/or position measurement can be based particularly on the use of sound waves and/or of electromagnetic waves as measurement signals. It is particularly suitable for ultrasonic systems or laser beam systems or radar systems, for example.

Besides the use of the method according to the disclosure for fleet operation of transport robots, for example in hospitals or care facilities, or for the operation of industrial trucks in industrial production or warehousing, a further field of use for the method according to the disclosure is setting up the method for motor vehicles that are operated at least intermittently using car-to-X communication, for example.

The disclosure additionally comprises a control program for the operation of mobile platforms that are set up for propagation-delay-based distance and/or position measurement. The control program is provided for a central switching center and is set up such that information about the individual mobile platforms is taken as a basis for the central switching center to assign the individual mobile platforms differently timed time slots for the distance and/or position measurement in phases. The information about the individual mobile platforms is particularly position data pertaining to the individual platforms. As soon as two or more mobile platforms are in a physical area in which disturbance or interference among the various measurement signals can be assumed, the control program is used to assign the individual mobile platforms differently timed time slots for the sending and receiving of the measurement pulses, so that interference is precluded. The disclosure additionally comprises a corresponding control program for the individual mobile platforms in order to receive and implement the commands from the central switching center. For further features of the method that can be executed using said control programs, reference is made to the description above. Finally, the disclosure comprises a machine-readable storage medium that stores such a control program, and also an electronic controller that is set up such that it can execute the method according to the disclosure. Expediently, the controller can have a machine-readable storage medium with the control program according to the disclosure. By way of example, the electronic controller may be a central computer that is used as a central switching center for the operation of the mobile platforms, or may be the respective control units of the individual mobile platforms.

Further features and advantages of the disclosure will emerge from the following description of exemplary embodiments in conjunction with the drawing. In this context, the individual features can be realized separately or in combination with one another in each case.

BRIEF DESCRIPTION OF THE DRAWING

The FIGURE shows a schematic illustration of the encounter between three mobile platforms with assignment, in accordance with the disclosure, of time slots for the distance and/or position measurement of the respective platforms.

DETAILED DESCRIPTION

The method according to the disclosure avoids interference between distance and/or position measuring systems of the same design in mobile platforms. Particularly when the distance and/or position measuring systems are in physical proximity, i.e. in a disturbance range, the problem of a system receiving the signal (echo) from a measurement pulse emitted by another system is solved. This is avoided by virtue of the disclosure providing for the individual systems to be assigned particular time windows or time slots. The time slots are only ever allocated to one system using a communication medium. Within this time frame, said system can perform its quite normal operation, that is to say can emit appropriate measurement pulses and receive them again as an echo, with propagation delay analysis being used to effect the distance and/or position evaluation. Information about the surroundings is extracted from the echos. This evaluation can be effected in real time or else downstream at a later time. In addition to a period t1 in which measurement signals are emitted and received again, a waiting period t2 may be provided in order to ensure that the emitted measurement signal has subsided completely in the space, i.e. that no further capturable echos return from the environment. Hence, the time slot t3 is obtained from t1+t2. In the case of the example of an ultrasonic system, t1 may be in a range between 10-50 ms, for example. The waiting period t2 may be in a range between 10-70 ms, depending on whether the evaluation is effected in real time or, in the case of a less powerful computer, after a slight delay. This results in t3 being approximately 20-120 ms. After the timeslot t3 has elapsed, a new timeslot can be allocated to the measuring system of another mobile platform. As soon as a mobile platform leaves the disturbance range, the associated measuring system can change over to normal operation again.

The assignment of time slots alters the repetition rate of the emission of measurement signals and hence usually also the maximum possible or permitted speed of the mobile platform. The reduction in the speed allows a reaction to any obstacles that exist in good time.

The FIGURE illustrates an exemplary scene in which a plurality of mobile platforms 1, 2, 3 meet one another or are in physical proximity in a junction area of a passageway system 10. The lower portion of the FIGURE shows a time profile. The mobile platforms 1, 2, 3 are each on the move in the direction of the arrow. The mobile platforms 1, 2, 3 are each equipped with an ultrasonic system 11, 21 and 31 for distance and/or position measurement. In addition, each mobile platform 1, 2, 3 has a respective communication unit 12, 22, 32. This is used to communicate with a central switching center 40, which likewise has communication means 42. The communication is preferably effected using a wireless medium, for example W-LAN, Bluetooth or other. The mobile platforms 1 and 2 are both in the junction area of the passageway system 10 and in that situation move within a disturbance range in which the measurement signals from both mobile platforms 1 and 2 can interfere. The mobile platform 3 will reach this disturbance range only after approximately ⅖ of the period shown in the lower portion of the FIGURE. In the time profile shown in this case, the individual mobile platforms are each assigned time slots that are denoted by 1, 2 or 3, depending on the platform. The mobile platform 2 is assigned the highest priority, since it is blocking the junction. Accordingly, the platform 2 is assigned the most time slots. The platform 2 leaves the disturbance range after approximately ⅔ of the time. It can then continue measurement again in normal operation, that is to say continuously and without assignment of time slots. From this period onward, the platform is no longer included in the allocation of time slots as per the illustration in the FIGURE. When the platform 1 has also left the area of the junction, that is to say is no longer in a disturbance range, the conflict situation is at an end and all platforms can resume normal operation.

For this embodiment of the method according to the disclosure, three measures are required in principle. First of all, it is necessary to identify whether there are a plurality of mobile platforms within a disturbance range. If this is the case, the mobile platforms involved are synchronized using a communication medium. Finally, the time slots are distributed as appropriate, particularly using a scheduler.

Potential disturbance situations can be identified in various ways. If the mobile platforms are equipped with a localization module, for example, and the disturbance radius r, which can be derived from the range of the measurement signals from a platform, is known, then a disturbance situation arises whenever a plurality of mobile platforms are within the radius r of a platform. If location information (for example a map of the environment) is available, it is also possible to take account of walls or the like that prevent the distance and/or position measuring systems from disturbing one another and hence can alleviate a disturbance situation. In addition, the measuring system of a platform or the central switching center can attempt, on the basis of various heuristics, to identify disturbing, that is to say alien, measuring systems. By way of example, this can occur by virtue of echos with an unnatural effect arising and accordingly being evaluated. If said echos accumulate, a disturbance situation can be assumed. Unnatural echos can be identified over a plurality of shots, for example, by means of tracking, since they normally do not move in the manner that would be expected for a physical object. If a platform B is in the disturbance range of a platform A, for example, echos from B arrive at A, for which the propagation delay measurement is incorrect, since the echos do not come from A. Therefore, the position reconstruction for the echo objects is also incorrect. If just one measurement cycle is considered, these incorrect objects cannot be identified without further assumptions, however. If a plurality of, for example 3-6, measurement cycles are considered, on the other hand, the objects should behave in a stable manner. This means that they move more or less uniformly or just statically, in which case it would be possible to compute out the proper movement of A. Incorrectly reconstructed objects do not usually behave in this manner, but rather "skip" to and fro in the scene over a plurality of measurement cycles. Therefore, a plurality of such skips allow a disturbance to be assumed. Unnatural echos can also be assumed if a plurality of echos come from the same direction. If a plurality of objects, i.e. echos, are ascertainable from the same direction (e.g. opening angle +/−4°) for a single measurement cycle, for example, this indicates a disturbance, since normally only one echo should come from one direction. Were there actually to be two or more objects present, the front object would normally conceal the signal from the rear object. A disturbance situation as a result of a further platform can therefore be assumed in the scene. Appropriate evaluation in the case of such signals cannot reveal the identity of the other mobile platform that is possibly causing the disturbance, however. In order to clarify the identity of the other platform, a communication device is useful, so that this other platform can then be included in the synchronization too.

Conventionally, communication devices are usually already provided for operation of a plurality of mobile platforms (fleet) in a system, so that a central switching center can communicate with the individual mobile platforms. The communication is often effected using a wireless medium such as W-LAN or Bluetooth with a plurality of receivers. Alternatively, other measures may be provided for communication, for example infrastructure measures such as rail systems embedded in the ground or the like. If the system operates with a central switching center, the scheduler that assigns the differently timed time slots for the distance and/or position measurement for the individual mobile platforms in accordance with the disclosure is expediently provided within the central switching center. An alternative is local communication, which involves the mobile platforms communicating with one another directly when they are in physical proximity, particularly in a disturbance range. Such systems are known in the realm of motor vehicles, for example as a car-to-X system. Comparably, these communications systems can be transferred to the application of mobile platforms. In this case too, it is advantageously possible to use wireless communication media, such as W-LAN, Bluetooth or light- or sound-based systems. A particular advantage in this case is that no fixed receivers are needed. One of the mobile platforms then undertakes the synchronization and sets up the scheduler, in a way, as a local central switching center. Which platform this is in the specific case can be stipulated using the same criteria that are also used for prioritization in the manner described above, for example.

The task of the scheduler is to allocate the individual time slots to a measuring system of a particular platform on the basis of particular criteria each time. In this case, the scheduler always includes all measuring systems or all mobile platforms that are inside the same disturbance range in the scheduling too. Advantageously, the scheduler is also capable of reacting dynamically to additional or disappearing measuring systems or mobile platforms by matching the schedule to the new situation each time. A time slot preferably has a particular length of time t3, said length also being able to differ for the individual mobile platforms. Depending on the criteria used, the scheduler requires further information about the mobile platforms, particularly about the position thereof. The information required is forwarded to the scheduler using the communication means that are in place.

The assignment of the time slots can be effected on the basis of various criteria or strategies, which can also be combined with one another. By way of example, the individual mobile platforms or measuring systems can be handled cyclically in succession, the individual mobile platforms thus forming a chronologically or cyclically sorted series (round robin). The first platform in the series is always allocated a time slot and is then re-sorted from the front right to the back. The new foremost platform then receives a time slot, etc. Additional or disappearing platforms are simply added to the series or removed from the series. In addition, a priority-based strategy can be pursued. In this case, the individual mobile platforms are allocated priorities and more or fewer time slots are provided depending on the priority. By way of example, possible criteria for the allocation of a priority status may be:

Battery state of charge: the lower the battery state of charge, the higher the priority of the platform, so as still to be able to travel to the charging station in good time.

The task: more important tasks are given a higher priority than unimportant ones. By way of example, fetching banked blood from the laboratory is sometimes more important than transporting an item of clothing.

The location: platforms that are in important or more highly frequented areas are given a higher priority. For example, one platform can clear the junction area or a blocked door more quickly, whereas another platform can wait in the passageway for longer.

The path of movement: platforms that leave the disturbance range more quickly are provided with higher priority in order to resolve the conflict situation more quickly.

The homogeneity of the movement: in order to guarantee a certain minimum speed, platforms can be allocated a time slot at least every x time periods.

These exemplary criteria can be combined with one another arbitrarily and matched to the respective circumstances.

By way of example, the aforementioned strategy based on round robin can be combined with the priority-based strategy such that the individual mobile platforms are handled cyclically, in principle, the platforms merely being sorted in the chronological series in line with their priority and, likewise depending on priority, not again, or possibly not every time, being sorted right to the back again, but rather further forward. By way of example, provision may also be made for the priority-based strategy to be carried out such that the platform with the highest priority is provided with all time slots (maximum prioritization) until it has disappeared from the disturbance range.

In a further variant of the method according to the disclosure, overlapping disturbance ranges are considered. Overlapping disturbance ranges arise whenever at least one platform is in two disturbance ranges with other mobile platforms. In the example of the FIGURE, the platform 2 is in a disturbance range with the platform 1 and in a further disturbance range with the platform 3. In the simplest case, the overlapping disturbance ranges can be combined into one large disturbance range, and the allocation of time slots is effected with different timing for all platforms. Alternatively, the scheduler can also allocate the same time slot to a plurality of platforms, namely when there are platforms that do not disturb one another, that is to say are not in an overlapping area of the different disturbance ranges. In reference to the example from the FIGURE, this would be the platforms 1 and 3, for example, which would not disturb one another at the beginning of the scenario, but rather are each only in one disturbance range for the platform 2. This approach can be transferred to any number of overlapping disturbance ranges in principle.

What is claimed is:

1. A method for operating a plurality of mobile platforms having sensor systems configured to perform propagation-delay-based distance measurement in a three-dimensional environment, the method comprising:

detecting locations of each mobile platform in the plurality mobile platforms with localization modules of the plurality mobile platforms;

identifying, with a central switching center, a subset of mobile platforms in the plurality mobile platforms that are within a predetermined distance of one another based on the detected locations;

synchronizing, with the central switching center, the sensor systems of the subset of mobile platforms;

determining a priority of each mobile platform in the subset of mobile platforms based on at least one criterion;

assigning, with the central switching center, differently timed time slots to each mobile platform in the subset of mobile platforms, mobile platforms in the subset of mobile platforms being determined to have a higher priority being assigned at least one of (i) longer time slots and (ii) more frequent time slots than mobile platforms in the subset of mobile platforms being determined to have a comparatively lower priority; and operating the sensor systems of subset of the subset of mobile platforms during the respective assigned time slots to perform the propagation-delay-based distance measurement in the three-dimensional environment.

2. The method according to claim 1, the assigning further comprising:

assigning the differently timed time slots in phases.

3. The method according to claim 1, the determining of the priority of each mobile platform in the subset of mobile platforms further comprising:

determining the priority of each mobile platform in the subset of mobile platforms based on a position of each mobile platform within the three-dimensional environment.

4. The method according to claim 1, the determining of the priority of each mobile platform in the subset of mobile platforms further comprising:

determining the priority of each mobile platform in the subset of mobile platforms based on a position of each mobile platform in relation to one another.

5. The method according to claim 1, the determining of the priority of each mobile platform in the subset of mobile platforms further comprising:

determining the priority of each mobile platform in the subset of mobile platforms based on paths of movement of the mobile platforms in the subset of mobile platforms.

6. The method according to claim 1, the assigning further comprising:

assigning the differently timed time slots chronologically in order by the determined priorities of the mobile platforms in the subset of mobile platforms.

7. The method according to claim 1, the determining of the priority of each mobile platform in the subset of mobile platforms further comprising:

determining the priority of each mobile platform in the subset of mobile platforms based on paths of movement of the mobile platforms in the subset of mobile platforms.

8. The method according to claim 1, wherein:

a control program is configured for operation of the mobile platforms, the control program is configured to take information about the individual mobile platforms as a basis for assigning the individual mobile platforms the differently timed time slots for the distance measurement, and the control program is installed on the central switching center.

9. The method according to claim 1, wherein:

a control program is configured to receive and to implement commands from the central switching center, and the central switching center is configured to take information about individual mobile platforms as a basis for assigning the individual mobile platforms the differently timed time slots for the distance measurement.

10. The method according to claim 9, wherein the control program is configured to execute the method when the control program is executed on a computation appliance.

11. The method according to claim 9, wherein a machine-readable storage medium stores the control program.

12. The method according to claim 1, wherein an electronic controller is configured to carry out the method.

* * * * *